Aug. 10, 1965  B. ROSS  3,199,519
CARGO TENT
Filed June 21, 1961  2 Sheets-Sheet 1

INVENTOR
BERTIE ROSS
BY Cushman, Darby & Cushman
ATTORNEYS

Aug. 10, 1965    B. ROSS    3,199,519
CARGO TENT
Filed June 21, 1961    2 Sheets-Sheet 2
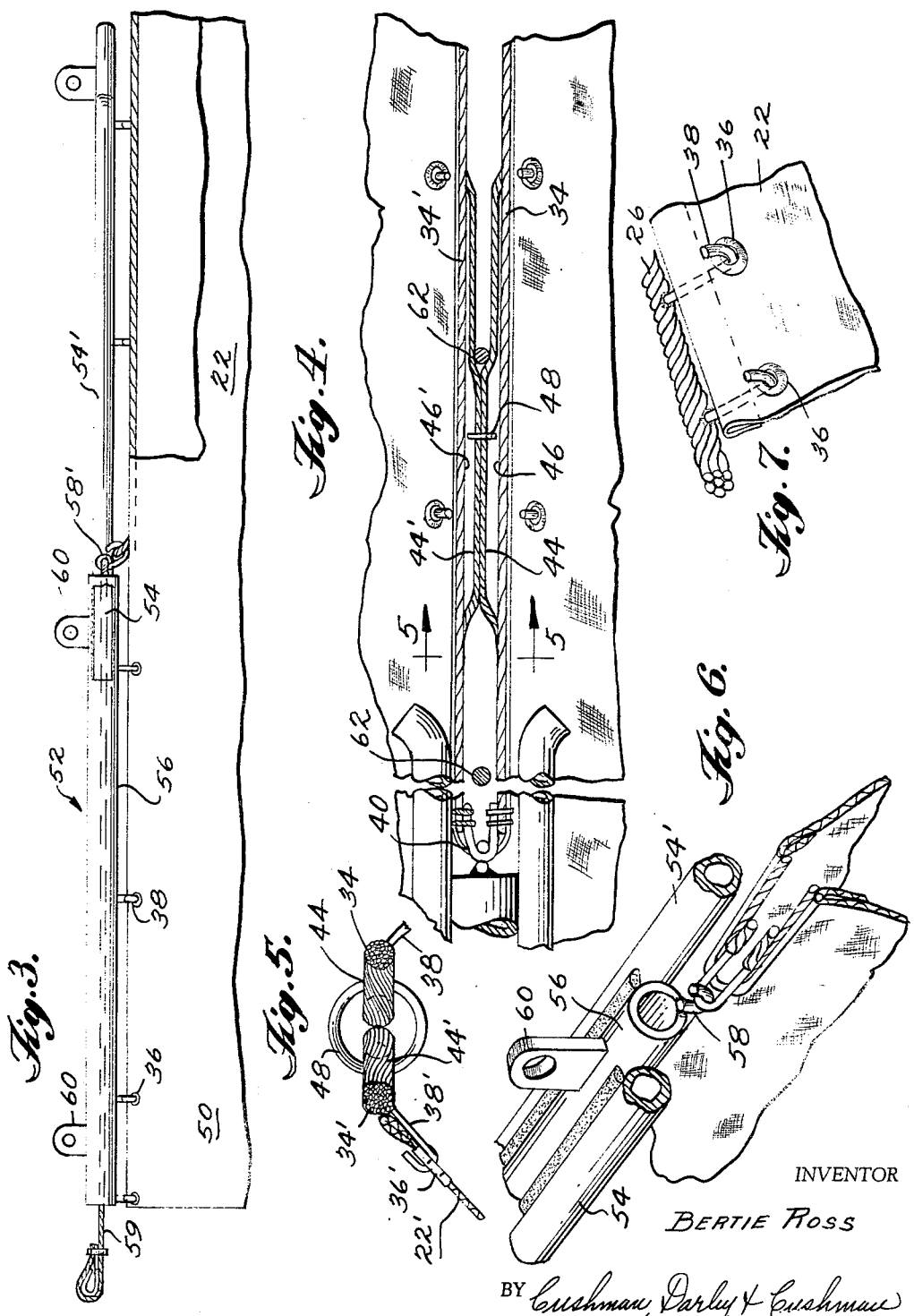
INVENTOR
BERTIE ROSS
BY Cushman, Darby & Cushman
ATTORNEYS

United States Patent Office 3,199,519
Patented Aug. 10, 1965

3,199,519
CARGO TENT
Bertie Ross, Metairie, La., assignor to Charles T. O'Neill, Brooklyn, N.Y.
Filed June 21, 1961, Ser. No. 118,675
6 Claims. (Cl. 135—6)

This invention relates to tent constructions and has particular reference to a new and improved cargo tent for mounting on the deck of a ship to facilitate handling cargo in inclement weather and the like.

The advantages of providing a tent structure mounted, for example, above the cargo hold of a ship are widely recognized in the maritime shipping industry, resulting in a rather highly developed state of this art. Such tents generally contemplate the provision of a cargo handling area which is sheltered from foul weather so that the cargo loaded or unloaded between the cargo hold of a ship and a pier is handled by workmen with relative convenience, while obviating damage to the cargo by water and the like.

Generally, such cargo tents are of relatively large size, as the cargo is generally carried in large containers or the like, or are otherwise relatively bulky, such as the case of automobiles. Such tents must also allow provision for moving the cargo, which generally includes the provision of an elongated slot along the apex of the tent to receive cargo handling lines movable along the slot, to move the cargo between the cargo hold and the pier.

A significant disadvantage of the prior art cargo tents of the character described is that during high winds, the tent, at its upper ends, tends to separate due to the wind catching the slotted apex of the tent, hereby resulting in rain or the like passing into the area which is to be kept relatively dry. The simple expedient of merely joining the slotted apex together in the center thereof as by a clip or the like is not practicable, as when the cargo is being handled by cargo lines, movement of the lines along the slotted area would break such a clip or tear the tent at this region.

To provide rigid members, such as metal channels or the like, along the apex of the tent is equally undesirable, due to the resulting added weight and cumbersome handling problems involved.

Accordingly, an object of this invention is to provide a collapsible cargo tent with a new and improved means for holding the opposed tent walls together along the slotted apex intermediate the ends while obviating the hazard of tearing the tent fabric by the great force of the cargo lines moving along this intermediate area.

Another object of this invention is to provide a new and improved cargo tent having side wall extensions extending beyond the sides of the ship to the area of an adjacent pier or the like so that the cargo can be moved from the hold of a ship to a relatively dry area on the pier during inclement weather.

A further object of this invention is to provide a cargo tent of the character described having new and improved means for engaging the intermediate portions of the tent along the apex, provision being made for a sliding ring member operatively connected to the cables along the ends of the tent to the side walls which is movable by the translation movement of the cargo lines.

A still further object of this invention is to provide a cargo tent of the character described having new and improved means for supporting the side wall extensions over the adjacent pier or cargo handling area adjacent the ship.

Still further objects, advantages, and novel features of this invention will become apparent in the specification and claims, taken with the accompanying drawings wherein:

FIGURE 3 is a partial elevation view of an alternative form of the tent portion extending beyond the side of the ship;

FIGURE 4 is a partial plan view of the tent;

FIGURE 5 is a view taken along lines 5—5 of FIGURE 4;

FIGURE 6 is a perspective view of the tent extension supporting means; and

FIGURE 7 is a perspective view of the means for carrying the tent sidewalls along the apex thereof.

Figure 1:
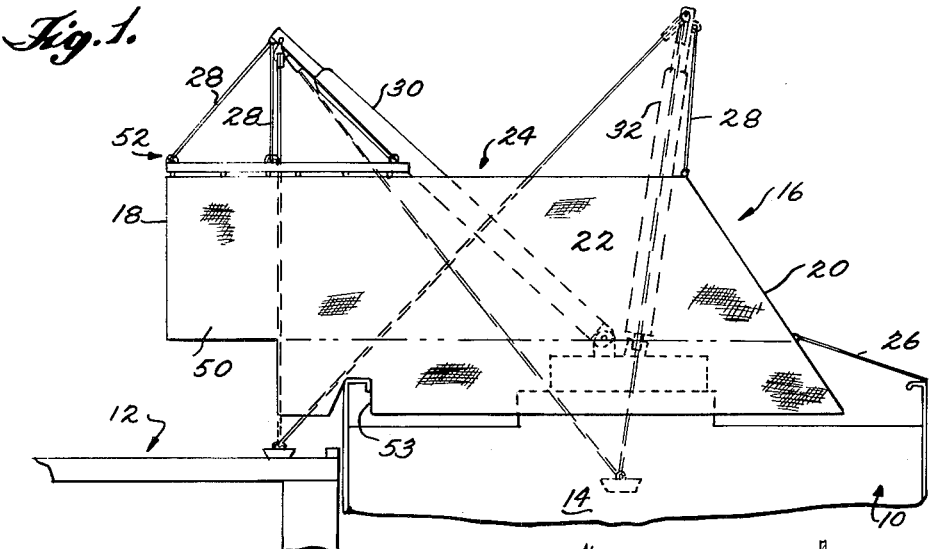
FIGURE 1 is an elevation view of a cargo tent according to this invention mounted above the cargo hold of a ship.

Referring now to the accompanying drawings, there is shown a ship 10 tied to an adjacent pier 12. Mounted on the ship 10 above a cargo hold 14 is a cargo tent 16 having an outboard or shore end 18 and an opposite or inboard closed end 20.

The cargo tent 16 has opposed side walls 22, 22' converging at their upper ends to define an apex 24, the walls 22, 22' being a flexible material.

The tent 16 is mounted above the cargo hold 14 by suitable deck lines 26, and supporting lines 28 connected to the ship booms 30, 32. These lines 26, 28 may be connected to the tent 16 by any convenient means, as is apparent.

Carried by the upper ends of the tent sidewalls 22, 22' along the apex 24 in aligned spaced apart relationship are tent cables 34, 34'. Numerous means for joining the tent fabric to the cables 34, 34' may be provided. For example, in FIGURES 5 and 7 the tent sidewalls 22, 22' have grommets 36, 36' respectively spaced along their upper ends for engagement with extending clips 38, 38' joined to the cables 34, 34', as by welding. The opposed tent cables 34, 34' are joined to one another at their ends by cable ends clips 40 and 42. These cable end clips may be of any suitable construction providing a secure engagement therebetween, and may also receive the lines 28, as desired.

Along the intermediate portion of the tent cable 34 is first auxiliary cable 44 spliced or otherwise joined to the tent cable 34 at its ends, providing elongated slot 46 therebetween. In a like manner, there is provided a second auxiliary tent cable 44' spliced or otherwise joined at its ends to the tent cable 34' in aligned relationship with respect to the first auxiliary tent cable 44. This second auxiliary tent cable defines a corresponding elongated slot 46' therealong.

An engaging ring 48 is carried by the first and second auxiliary cables 44, 44' and slidable along the slots 46, 46'. As will be appreciated, the engaging ring 48 provides an intermediate sliding joint between the opposed tent side walls 22, 22' along its path of movement.

The outboard end 18 of the tent 16 has side wall extensions 50, 50' which extend beyond the side of the ship and over an adjacent cargo handling pier area 12.

As shown in FIGURE 1, the tent sidewalls have recessed portions 53 to receive the sides of the ship.

According to one novel feature of this invention, there is provided a sidewall extension support member 52 having the general configuration of a tuning fork. There are provided opposed legs 54, 54' joined to an extending arm 56 as by welding. In FIGURES 4 and 6, the inner end of the arm 56 carries a clip 58 for engagement with the adjacent end clip 40.

Alternatively, in FIGURE 3a clip 58' is carried by a cable length 59 which is adapted to be carried by a supporting line (not shown) extending from the pier.

Thus, the support member 52 may be constructed of pipe, and carry clips 38 for engagement with the tent grommets 36. The support member 52 conveniently has padeyes 60 welded thereto for engagement with the supporting lines 22 carried by the boom 30.

In operation, the tent 16 is assembled as described and cargo handling lines 62, extending from the booms 30 and 32 are passed between the apex slot defined by the tent cables 34, 34', at opposite ends thereof.

Figure 2:
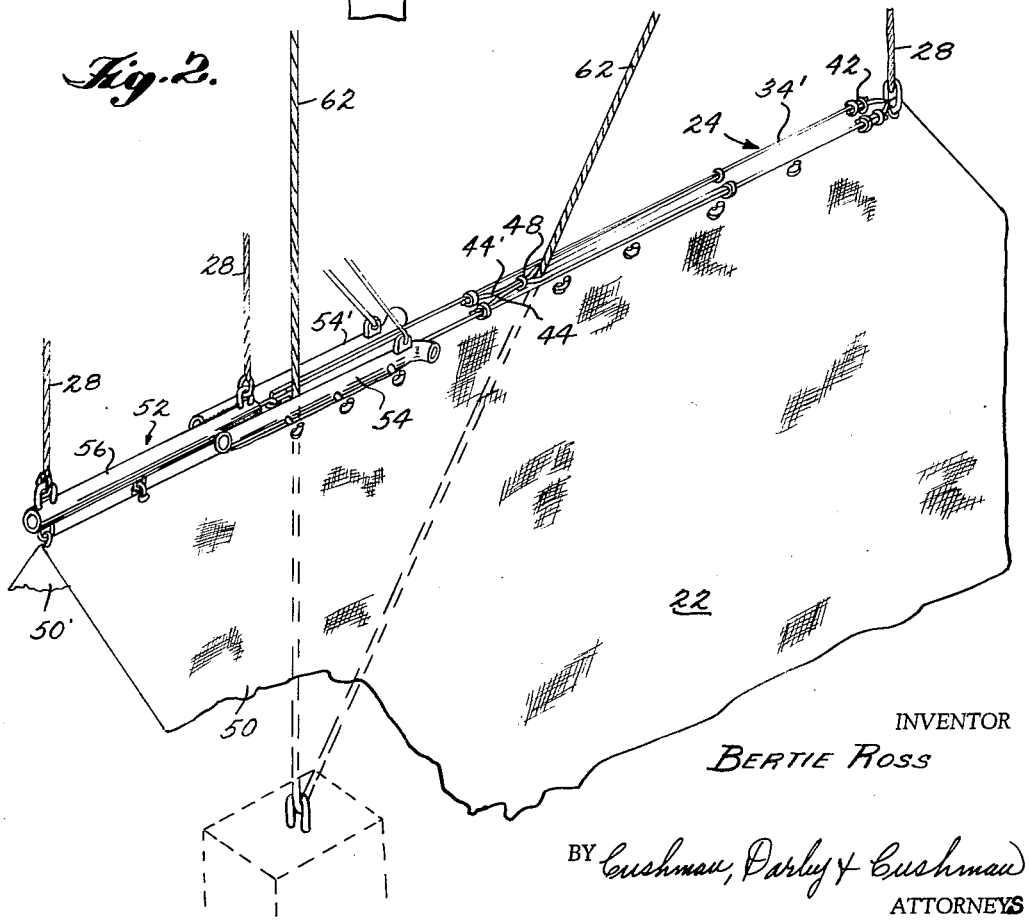
FIGURE 2 is a top perspective view of the cargo tent in FIGURE 1.

As the cargo lines 62 (providing a burtoning rig) are moved along the slot, they may pass between the auxiliary cables 44, 44' (FIGURES 2 and 4); but, by virtue of the sliding engagement of the ring 48, a yielding action is provided. Thus, each cargo line 62 can be moved along a substantial portion of the apex 24, and an intermediate joint connection is always maintained.

By virtue of providing the elongated slots 46, 46' for movement of the ring 48, the possibility of tearing the tent is obviated, as no adverse stress is imparted to the tent fabric.

It is seen that the objects of this invention together with many practical advantages are successfully achieved.

While a preferred embodiment of my invention is described, it will be apparent to those skilled in the art that numerous mechanical changes may be made without departing from the spirit of this invention.

Therefore, the specification and drawings should be considered in a descriptive sense only, the scope of my invention being defined in the claims.

I claim:

1. Cargo tent for mounting above the cargo hold of a ship or the like to facilitate cargo handling in inclement weather comprising: opposed tent sidewalls converging at their upper ends; aligned tent cables carried along the upper end of each of said tent sidewalls in spaced apart relationship, said tent cables being joined together at opposite ends of said tent sidewalls; means joining said tent cables together intermediate the ends thereof including a first auxiliary cable joined at its ends to one of said tent cables; a second auxiliary cable joined at its ends to said other tent cable in aligned relationship with said first auxiliary cable, and a ring member slidably engaging said auxiliary cables, whereby a cargo line passed between adjacent tent cables at one end of said tent is movable between said auxiliary cables while said engaging ring maintains the intermediate portions of said tent cables in operative engagement.

2. Cargo tent defined in claim 1 wherein said tent is adapted for mounting in transverse relation to the ship, said tent having an outboard end adjacent one side of the ship, and an opposite inboard end, said sidewalls adjacent the outboard end having sidewall extensions passing beyond the side of the ship, sidewall extension supporting means engaged to the upper ends of said extensions in operative engagement with the adjacent ends of said tent cables and with supporting line receiving means carried by said extension supporting means.

3. Cargo tent defined in claim 2 wherein said sidewall extension supporting means includes an extending arm having opposed leg members joined to the inner end thereof and in operative engagement with said ten cables.

4. Cargo tent defined in claim 3 wherein said sidewall extension supporting means has a passage therethrough, a cable passing through the passage and joined at its inner end with the adjacent ends of said tent cable, the opposite end thereof being for engagement with an anchorage line.

5. Cargo tent defined in claim 1 wherein said walls are a flexible material whereby the cargo tent may be collapsed and stored in a minimum of space.

6. Cargo tent for mounting above the cargo hold of a ship or the like to facilitate cargo handling in inclement weather comprising: opposed tent sidewalls converging at their upper ends to define an apex portion, aligned tent cables carried along the apex portion of each of said tent sidewalls in spaced apart relationship, said tent cables being joined together at opposite ends of said tent sidewalls, auxiliary means connected at spaced points to each of said cables intermediate the ends thereof and means slidably engaging and operatively joining said auxiliary means in abutting relationship, said slidable means being movable relative to said tent cables whereby cargo lines passing between said tent cables are movable between the opposite joined ends of said tent cables to facilitate cargo handling.

References Cited by the Examiner

UNITED STATES PATENTS

| 451,903 | 5/91 | Walsh | 214—13 |
|---|---|---|---|
| 524,137 | 8/94 | Enright | 135—6 |
| 1,640,188 | 8/27 | Grunbock | 135—6 |
| 2,163,072 | 6/39 | Spelman | 135—6 |
| 2,201,781 | 5/40 | MacGeorge | 135—6 |
| 2,843,273 | 7/58 | Sanden | 135—5 |
| 2,849,010 | 8/58 | Marino | 135—1 |

FOREIGN PATENTS

| 775,672 | 5/27 | Great Britain. |
|---|---|---|
| 802,234 | 10/57 | Great Britain. |

HARRISON R. MOSELEY, *Primary Examiner.*

M. HENSON WOOD, Jr., DONLEY J. STOCKING,
*Examiners.*